US012320156B2

(12) United States Patent
Su et al.

(10) Patent No.: US 12,320,156 B2
(45) Date of Patent: Jun. 3, 2025

(54) DRIVING MECHANISM FOR DOOR LOCK, AND DOOR LOCK

(71) Applicant: Shenzhen Kaadas Intelligent Technology Co., Ltd., Guangdong (CN)

(72) Inventors: Qiyun Su, Guangdong (CN); Zhongxiang Liang, Guangdong (CN)

(73) Assignee: SHENZHEN KAADAS INTELLIGENT TECHNOLOGY CO., LTD., Guangdong (CN)

( * ) Notice: Subject to any disclaimer, the term of this patent is extended or adjusted under 35 U.S.C. 154(b) by 134 days.

(21) Appl. No.: 18/128,017

(22) Filed: Mar. 29, 2023

(65) Prior Publication Data

US 2023/0243185 A1 Aug. 3, 2023

Related U.S. Application Data

(63) Continuation of application No. PCT/CN2021/114781, filed on Aug. 26, 2021.

(30) Foreign Application Priority Data

Sep. 30, 2020 (CN) ......................... 202011073937.3
Sep. 30, 2020 (CN) ......................... 202022223923.7

(Continued)

(51) Int. Cl.
*E05B 47/00* (2006.01)

(52) U.S. Cl.
CPC .. *E05B 47/0012* (2013.01); *E05B 2047/0017* (2013.01); *E05B 2047/0022* (2013.01)

(58) Field of Classification Search
CPC ....... E05B 47/00; E05B 47/0012–0015; E05B 47/0017; E05B 47/0018; E05B 47/002; E05B 47/0022

(Continued)

(56) References Cited

U.S. PATENT DOCUMENTS 4,573,723 A * 3/1986 Morita .................... E05B 81/25 70/279.1
5,669,843 A * 9/1997 Bolton .................... E05B 81/25 475/343

(Continued)

FOREIGN PATENT DOCUMENTS

CN 110439376 A 11/2019
CN 110847713 A 2/2020

(Continued)

OTHER PUBLICATIONS

International Search Report dated Nov. 25, 2021 received in International Application No. PCT/CN2021/114781.

*Primary Examiner* — Nathan Cumar

(74) *Attorney, Agent, or Firm* — Scully, Scott, Murphy & Presser, P.C.

(57) ABSTRACT

The present disclosure provides a driving mechanism for a door lock and a door lock. The driving mechanism includes a motor, a planet gear assembly and a holding frame. The planet gear assembly includes a gear ring, a planet gear and a sun gear. The motor is rotatably coupled to the sun gear. The gear ring defines a receiving space. The planet gear and part of the sun gear are received in the receiving space. The planet gear is rotatably coupled between the sun gear and the gear ring. The holding frame is located on one side of the planet gear assembly. The planet gear is coupled to the holding frame. When the gear ring is in an unmovable state, the sun gear is rotated by the motor. When the sun gear is in an unmovable state, the gear ring is controlled to rotate.

17 Claims, 15 Drawing Sheets

(30) Foreign Application Priority Data

| | | |
|---|---|---|
| Sep. 30, 2020 | (CN) | 202121550702.9 |
| Sep. 30, 2020 | (CN) | 202121551699.2 |
| Sep. 30, 2020 | (CN) | 202121553523.0 |

(58) Field of Classification Search
USPC .......... 70/277
See application file for complete search history.

(56) References Cited

U.S. PATENT DOCUMENTS

| | | | | |
|---|---|---|---|---|
| 9,982,461 | B1 * | 5/2018 | Kilbourne | E05B 47/0012 |
| 2018/0209176 | A1 * | 7/2018 | Ku | E05B 1/0053 |
| 2018/0320413 | A1 * | 11/2018 | Wong | E05B 47/02 |

FOREIGN PATENT DOCUMENTS

| | | | | |
|---|---|---|---|---|
| CN | 111648676 | A | 9/2020 | |
| FR | 2696493 | A1 * | 4/1994 | E05B 47/0012 |
| KR | 200428317 | Y1 | 10/2006 | |
| WO | 2004059110 | A1 | 7/2004 | |

* cited by examiner

DRIVING MECHANISM FOR DOOR LOCK, AND DOOR LOCK

CROSS-REFERENCE TO RELATED APPLICATIONS

This application is a continuation application of International Application No. PCT/CN2021/114781, filed Aug. 26, 2021, which claims priority to Chinese Patent Application No. 2021215507029, filed on Sep. 30, 2022, and Chinese Patent Application No. 2021215535230, filed on Sep. 30, 2022, and Chinese Patent Application No. 2021215516992, filed on Sep. 30, 2022, and Chinese Patent Application No. 2020222239237, filed on Sep. 30, 2022, and Chinese Patent Application No. 2020110739373, filed on Sep. 30, 2022, the entire disclosures of each of which are hereby incorporated by reference.

TECHNICAL FIELD

The present disclosure relates to fields of door locks, and in particular to a driving mechanism for door lock and door lock.

BACKGROUND

As the number of people is increasing, the number of houses is also increasing. Door lock is one of the important structures that control the opening and closing of house. Therefore, the expectation and demand of the people for door lock is getting higher and higher. At present, the door lock usually uses the motor lock, that is, the motor drives the movement of the lock cylinder to open and close the door. However, if the motor or driving mechanism fails, the whole motor lock will not be able to move and the user will not be able to open the door from inside the house, which greatly increases the difficulty and risk of opening the door.

SUMMARY

Therefore, the present disclosure provides a driving mechanism for door lock and door lock. The driving mechanism comprises a motor, a planet gear assembly and a holding frame. The planet gear assembly comprises a gear ring, a planet gear and a sun gear. The motor is rotatably coupled to the sun gear. The gear ring defines a receiving space. The planet gear and a part of the sun gear are both received in the receiving space. The planet gear is rotatably coupled between the sun gear and the gear ring. The holding frame is located on one side of the planet gear assembly. The gear ring and the sun gear both abut against the holding frame. The planet gear is coupled to the holding frame. When the gear ring is in an unmovable state, the sun gear is driven be the motor to rotate, thereby driving the planet gear to rotate relative to the gear ring. Or, when the sun gear is in an unmovable state, the gear ring is driven to rotate, thereby driving the planet gear to rotate relative to the sun gear.

The driving mechanism in the present disclosure is provided with the planet gear assembly, such that the motor is rotatably coupled to the sun gear, that is, the motor can control the sun gear to rotate. Furthermore, the planet gear can be coupled to the holding frame, that is, the planet gear can control the holding frame to rotate. In addition, the present disclosure can finally make the planet gear rotate by mutual cooperation of the gear ring, the planet gear and the sun gear, thereby driving the holding frame to rotate, and finally driving a lock cylinder coupled to the holding frame to rotate, so as to realize opening or closing of a door.

The specific method of cooperation between the gear ring, the planet gear, and the sun gear is understood to be that when the gear ring is in the unmovable state, the sun gear may be driven by the motor to rotate, thereby driving the planet gear to rotate relative to the gear ring. At this time, the door can be opened or closed by means of the motor. When the motor fails to rotate the sun gear, and the sun gear is fixed in the unmovable state, the gear ring can be driven to rotate, thereby driving the planet gear to rotate relative to the sun gear. In this way, even when the motor fails, it is still possible to open or close the door by rotating the gear ring.

In summary, the driving mechanism provided by the present disclosure, achieves the opening or closing of the door by two ways. One of the two ways is using the motor to control the sun gear to rotate. The other of the two ways is directly controlling the gear ring to rotate. Thus, the ways of opening or closing of the door are increased, avoiding the problem of not being able to open or close the door due to the damage of the motor in a single motor lock, reducing the difficulty and risk of opening the door.

The present disclosure provides a driving mechanism for a door lock. The driving mechanism comprises a motor, a planet gear assembly, and a holding frame. The planet gear assembly comprises a gear ring, a planet gear, and a sun gear. The motor is rotatably coupled to the sun gear. The planet gear is rotatably coupled to the sun gear. The planet gear is further rotatably coupled to the gear ring. The holding frame is coupled to the planet gear. When the gear ring is in an unmovable state, the sun gear is rotated by the motor so as to rotate the planet gear relative to the gear ring, thereby driving the holding frame to rotate; or, when the sun gear is in an unmovable state, the gear ring is controlled to rotate so as to rotate the planet gear relative to the sun gear, thereby driving the holding frame to rotate.

The present disclosure provides a driving mechanism for a door lock. The driving mechanism comprises a motor, a planet gear assembly, and a gear frame. The planet gear assembly comprises a gear ring, a planet gear, and a sun gear. The motor is rotatably coupled to the sun gear. The planet gear is rotatably coupled to the sun gear. The planer gear is also rotatably coupled to the gear ring. The gear frame is rotatably coupled to the gear ring. The gear frame has an unmovable state or a rotating state. When the gear frame is in the unmovable state, the gear ring is also in the unmovable state. The sun gear is driven by the motor to rotate so as to rotate the planet gear to rotate relative to the gear ring. Or, when the sun gear is in the unmovable state, and the gear frame is in the rotating state, the gear frame is controlled to rotate, so as to rotate the gear ring, thereby driving the planet gear to rotate relative to the sun gear.

The present disclosure provides a driving mechanism for a door lock. The driving mechanism comprises a motor, a holding frame, and an universal joint. The motor is rotatably coupled to the holding frame. The universal joint is rotatably coupled to the holding frame. The holding frame has a first rotating direction. The universal joint has a second rotating direction. The first direction is intersected with the second rotating direction. The universal joint is used to couple a lock cylinder mechanism. The motor can control the holding frame to rotate, so as to rotate the universal joint, which in turns drives the lock cylinder mechanism to rotate.

The present disclosure further provides a door lock. The door lock comprises a lock cylinder, and a driving mechanism as provided in the above embodiment of the present disclosure. The lock cylinder is rotatably coupled to another side of the holding frame. The lock cylinder is moved by a rotation of the holding frame so as to opening or close a door.

The door lock provided by the present disclosure is provided with the above driving mechanism of the present disclosure, achieves the opening or closing of the door by two ways. One of the two ways is using the motor to control the sun gear to rotate. The other of the two ways is directly controlling the gear ring to rotate. Thus, the ways of opening or closing of the door are increased, avoiding the problem of not being able to open or close the door due to the damage of the motor in a single motor lock, reducing the difficulty and risk of opening the door.

BRIEF DESCRIPTION OF THE ACCOMPANYING DRAWINGS

In order to more clearly describe the technical solutions in the embodiments of the present disclosure, the following will briefly introduce the accompanying drawings needed in the embodiments.

DESCRIPTION OF REFERENCE NUMERALS

1: driving mechanism; 10: motor; 20: planet gear assembly; 21: gear ring; 211: receiving space; 22: planet gear; 23: sun gear; 231: first sub sun gear; 232: second sub sun gear; 24: first side; 25: second side; 30: holding frame; 40: transmission mechanism; 41: first gear; 42: second gear; 43: third gear; 44: protective housing; 50: gear frame; 51: handle frame; 52: limiting part; 53: elastic member; 54: first receiving slot; 60: housing; 61: accommodating space; 62: through hole; 63: limiting slot; 70: universal joint; 71: second receiving slot; 72: protruding portion; 73: first rotating space; 74: first rotating part; 75: second rotating part; 76: second rotating space; 77: hole; 78: rotating shaft; 79: protecting part.

DETAILED DESCRIPTION OF ILLUSTRATED EMBODIMENTS

The following is a preferred embodiment of the present disclosure. It should be noted that for a person of ordinary skill in the art, several improvements and embellishments can be made without departing from the principles of the present disclosure, and these improvements and embellishments are also considered to be within the scope of protection of the present disclosure.

Before introducing the technical solution of the present disclosure, the technical problems in the related technology will be described in detail.

The door lock is one of important structural parts of the door, which can control the door to open or close the room, space and so on. The existing technology usually uses a purely mechanical door lock structure, i.e., the use of keys to drive the movement of the structure inside the door lock to achieve the opening or closing of the door. With the advancement of technology and the changing needs of users, electronic locks have now appeared in people's eyes and are attracting the attention of users. Electronic locks do not require the use of keys under normal circumstances, but only face recognition, password input, fingerprint input, voice recognition and other methods to automatically drive the door lock structure movement through the built-in circuit to achieve the opening or closing of the door. This brings great convenience and user experience. However, once the motor, circuit structure, or other structural components of the motor lock malfunction, resulting in a problem in the motor lock, it will lead to the motor lock does not work properly, the user outside the door will not be able to open the door through the electronic lock to enter the room, only through the mechanical key to enter the room. And the user inside the door cannot open the door out of the room, then only the door or door lock using the method of violent demolition, thus causing irreversible damage to the door, greatly increasing the difficulty and risk of unlocking.

Figure 1:
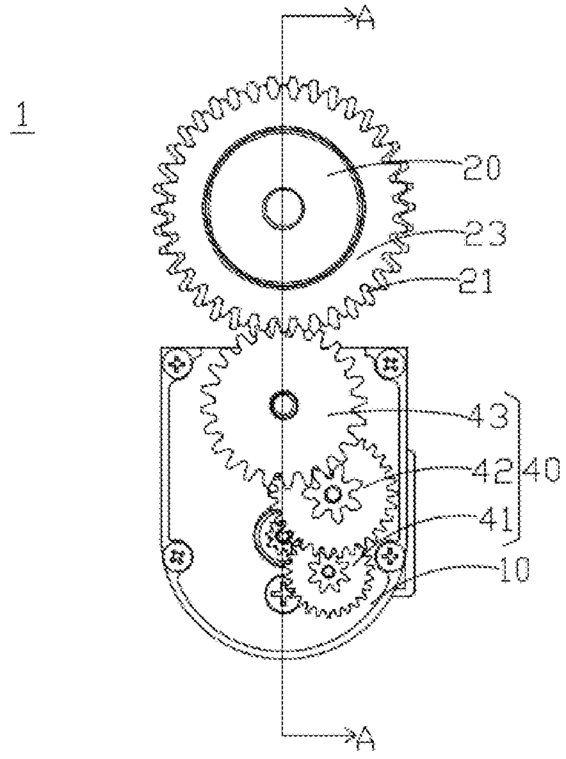
FIG. 1 is a structural diagram of a driving mechanism according to one embodiment of the present disclosure.
Figure 2:
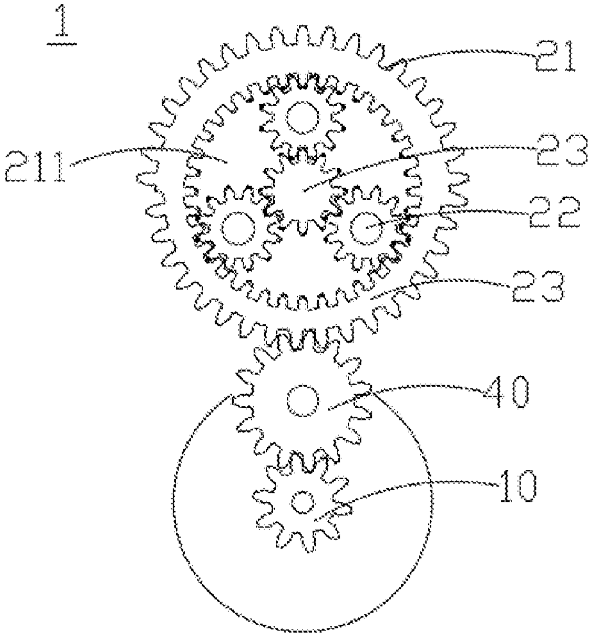
FIG. 2 is a schematic diagram of the driving mechanism according to one embodiment of the present disclosure.
Figure 3:
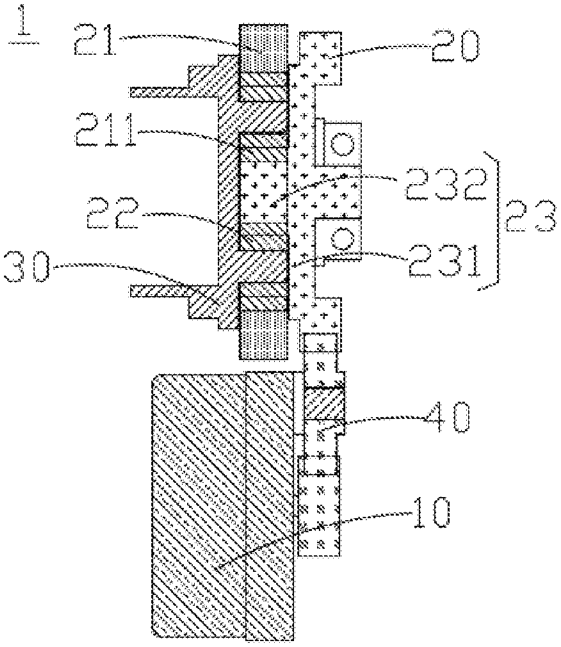
FIG. 3 is a cross-sectional diagram along an A-A direction in FIG. 1.

Referring to FIGS. 1-3, FIG. 1 is a structural diagram of a driving mechanism according to one embodiment of the present disclosure. FIG. 2 is a schematic diagram of the driving mechanism according to one embodiment of the present disclosure. FIG. 3 is a cross-sectional diagram along an A-A direction in FIG. 1. The present disclosure provides a driving mechanism 1 for door lock. The driving mechanism 1 can include a motor 10, a planet gear assembly 20 and a holding frame 30. The planet gear assembly 20 can include a gear ring 21, a planet gear 22, and a sun gear 23. The motor 10 is rotatably coupled to the sun gear 23. The gear ring 21 defines a receiving space 211. The planet gear 22 and a part of the sun gear 23 are both received in the receiving space 211. The planet gear 22 is rotatably coupled between the sun gear 23 and the gear ring 21. The holding frame 30 is located on one side of the planet gear assembly 20. The gear ring 21 and the sun gear 23 both abut against the holding frame 30. The planet gear 22 is coupled to the holding frame 30. When the gear ring 21 is in an unmovable state, the sun gear 23 is driven be the motor 10 to rotate, thereby driving the planet gear 22 to rotate relative to the gear ring 21. Or, when the sun gear 23 is in an unmovable state, the gear ring 21 is driven to rotate, thereby driving the planet gear 22 to rotate relative to the sun gear 23.

The driving mechanism 1 provided in at least one embodiment is one of the important structural parts of the door lock. The door lock mainly includes the driving mechanism 1, a lock cylinder, and a lock body. The lock body is mounted in a door. The lock cylinder is mounted in the lock body. A pull wheel of the lock cylinder can drive a latch of the lock body to extend to open the door or retract to close the door. The driving mechanism 1 is mounted outside the door and connects the door and the lock cylinder inside the door at the same time. The movement of the driving structure can drive the movement of the lock cylinder so as to achieve the extension and retraction of the latch.

The drive mechanism 1 provided in at least one embodiment includes a motor 10 and a power supply. The motor 10 is electrically coupled to the power supply, and the power supply can provide the required energy to the motor 10, and the motor 10 can work and rotate after receiving the electrical energy. Optionally, the power supply may include a non-rechargeable battery or a rechargeable battery.

The driving mechanism 1 provided in at least one embodiment can further include the planet gear assembly 20. The planet gear assembly 20 can include a plurality of structural members. For example, the planet gear assembly 20 can include the gear ring 21, the planet gear 22 and the sun gear 23. The names of the three structural members are technical terms for gears in the trade of those skilled in the art. The gear ring 21 is a circular gear. The gear ring 21 defines the receiving space 211. The gear ring 21 has an inner ring of teeth and an outer ring of teeth. In addition, the planet gear 22 and the sun gear 23 both have an outer ring of teeth. The planet gear 22 and a part of the sun gear 23 are both received in the receiving space 211. It can also be understood that one part of the sun gear 23 is received in the receiving space 211, and the other part of the sun gear 23 is located outside of the receiving space 211. As for the motor 20 is rotatably coupled to the sun gear 23, it can be understood that the motor 10 is rotatably coupled to the sun gear 23 outside the receiving space 211, and drives the sun gear 23 inside the receiving space 211 to rotate. Secondly, the motor 10 rotatably coupled to the sun gear 23 may be that the motor 10 is directly coupled to the sun gear 23, or, other transmission mechanism 40 is provided between the motor 10 and the sun gear 23. One end of the transmission mechanism 40 is rotatably coupled to the motor 10, and the other end of the transmission mechanism 40 is rotatably coupled to the sun gear 23. The motor 10 drives the transmission mechanism 40 to rotate, and the transmission mechanism 40 rotates to drive the sun gear 23 to rotate. At this point, it can be seen as the motor 10 indirectly rotating connected to sun gear 23. As for the specific structure of the transmission mechanism 40, the present disclosure will describe later.

Secondly, the planet gear 22 is rotatably coupled between the sun gear 23 and the gear ring 22. It can be understood that one end of the planet gear 22 is rotatably coupled to inner teeth of the gear ring 21, the other end of the planet gear 22 is rotatably coupled to outside teeth of the sun gear 23. The gear ring 21, the planet gear 22, and the sun gear 23 three kinds of gears link the entire planet gear assembly 22 through the planet gear 22. Optionally, the number of the plant gears 22 can be multiple. Each planet gear 22 is arranged at even intervals. For example, the number of the planet gears 22 is three. Each planet gear 22 is set at 120° apart. This will increase rotating stability of the planet gear assembly 22 and the holding frame 30.

The driving mechanism 1 provided by at least one embodiment can further include the holding frame 30. The holding frame 30 can be a frame mounting the planet gear assembly 20, and other structural members. The planet gear assembly 20 is located on one side of the mounting member, the lock cylinder is located on another side of the mounting member. The gear ring 21 of the planet gear assembly 20 and the sun gear 23 both abut against the holding frame 30. The planet gear 22 is coupled to the holding frame 30. In this way, when the gear ring 21 and the sun gear 23 are rotating, the movement of the holding frame 30 will not be affected. The planet gear 22 is coupled to the holding frame 30, therefore, the rotation of the planet gear 22 is driven by the holding frame 30, and the movement of the lock cylinder is driven by the rotation of the holding frame 30.

The above content is the mechanical structure of the driving mechanism 1 provided in at least one embodiment. As for how to realize the movement of the driving mechanism 1, at least one embodiment can be achieved by the mutual cooperation of the gear ring 21, the planet gear 22 and the sun gear 23 to eventually drive the planet gear 22 rotate, and then drive the holding frame 30 to rotate, and eventually drive the movement of the lock cylinder coupled to the holding frame 30 to open or close the door. The specific method of cooperation between the gear ring 21, the planet gear 22, and the sun gear 23 can be understood as that one of the gear ring 21 and the sun gear 23 is made in the unmovable state, the other of the gear ring 21 and the sun gear 23 be rotated with the planet gear 22, so that planet gear 22 can rotate around the sun gear 23, which in turn rotates the holding frame 30. For example, when the gear ring 21 is in the unmovable state, the sun gear 23 is rotated by the motor 10 to rotate the planet gear 22 relative to the gear ring 21, which in turn rotates the holding frame 30, so that the door can be opened or closed by the motor 10. When the motor 10 fails to work properly, the sun gear 23 cannot be rotated and the sun gear 23 is in the unmovable state, so the gear ring 21 is directly controlled to rotate, it is possible to rotate the planet gear 22 relative to the sun gear 23, thereby driving the holding frame 30 to rotate. This allows the door to be opened or closed by controlling the rotation of the gear ring 21 even when the motor 10 fails. Optionally, the structure and method of fixing and rotating the gear ring 21 will be described in detail later in the present disclosure.

In summary, the driving mechanism 1 provided by the present disclosure, the door is opened or closed by using two ways. One of the two ways is using the motor 10 to control the sun gear 23 to rotate. The other of the two ways is directly controlling the gear ring 21 to rotate. Thus, the ways of opening and closing of the door are increased, avoiding the problem of not being able to open and close the door due to the damage of the motor 10 in a single motor lock, reducing the difficulty and risk of opening the door.

Optionally, referring to FIG. 1, the transmission mechanism 40 can include a first gear 41, a second gear 42 and a third gear 43. The first gear 41 is rotatably coupled to the motor 10. The second gear 42 is rotatably coupled to the first gear 41. The third gear 43 is rotatably coupled to the second gear 42. The rotation of the motor 10 can be transmitted to the sun gear 23 by the plurality of gears.

Figure 4:
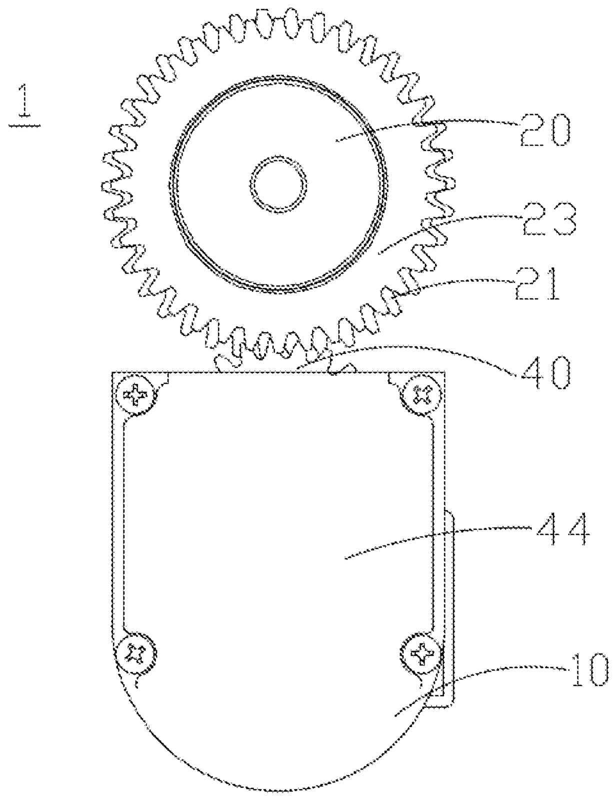
FIG. 4 is a structural diagram of the driving mechanism according to another embodiment of the present disclosure.

Referring to FIG. 4, FIG. 4 is a structural diagram of the driving mechanism according to another embodiment of the present disclosure. In at least one embodiment, the driving mechanism 1 can further include a protective housing 44. The protective housing 44 covers the driving mechanism 40. The driving mechanism 40 of at least one embodiment can be better protected by using the protective housing 44.

Figure 5:
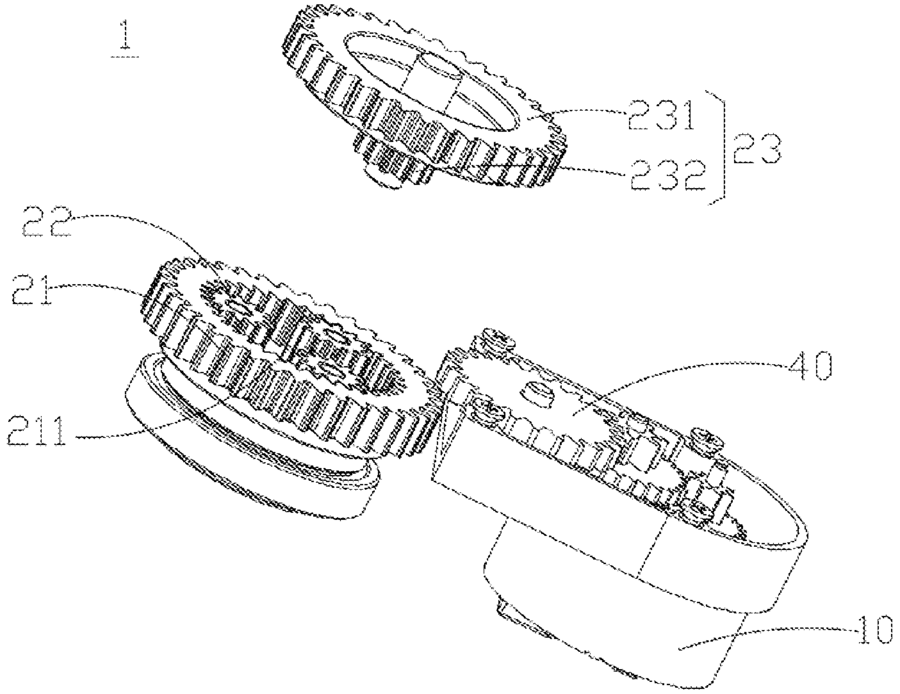
FIG. 5 is a partial exploded diagram of the driving mechanism according to one embodiment of the present disclosure.

Referring to FIGS. 3 and 5, FIG. 5 is a partial exploded diagram of the driving mechanism according to one embodiment of the present disclosure. In at least one embodiment, the sun gear 23 can include a first sub sun gear 231 and a second sub sun gear 232 provided coaxially. The motor 10 is rotatably coupled to the first sub sun gear 231. The second sub sun gear 232 is received in the receiving space 211. The second sub sun gear 232 is rotatably coupled to the planer gear 22.

The above content describes that part of the sun gear 23 is received in the receiving space 211. In detail, in at least one embodiment, the sun gear 23 can include a first sub sun gear 231 and a second sub sun gear 232 provided coaxially. The first sub sun gear 231 is located out of the receiving space 211, and is rotatably coupled to the motor 10. The second sub sun gear 232 is received in the receiving space 211. The second sub sun gear 232 is rotatably coupled to the planer gear 22. Therefore, the sun gear 23 can be rotatably coupled to the motor 10 outside the receiving space 211, but also rotatably coupled to the planet gear 22 inside the receiving space 211.

Figure 6:
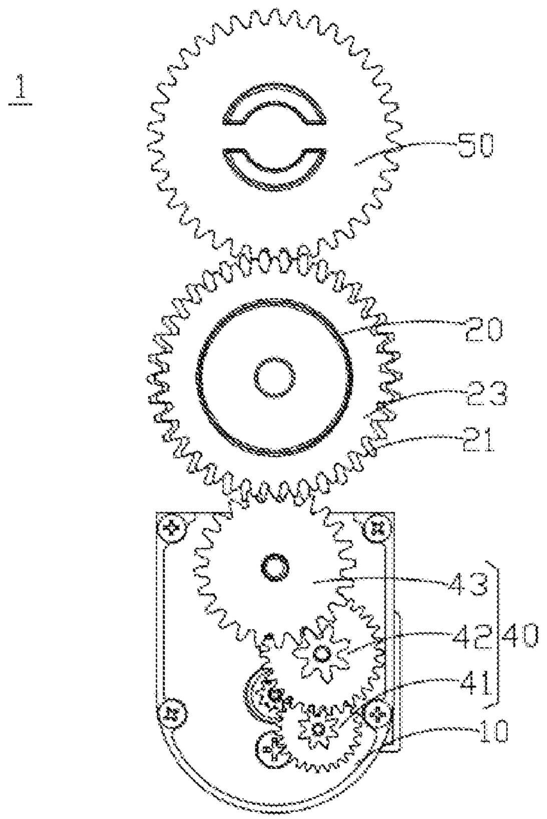
FIG. 6 is structural diagram of the driving mechanism according to another embodiment of the present disclosure.
Figure 7:
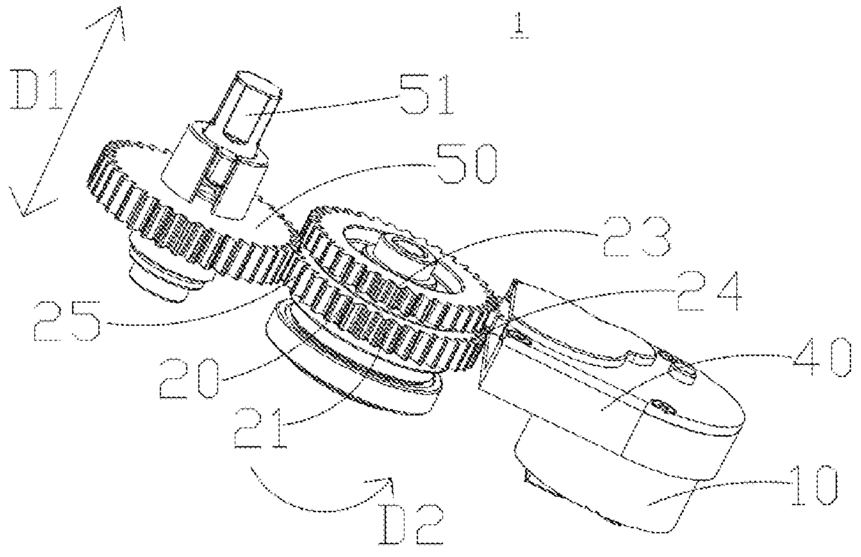
FIG. 7 is a structural diagram of the driving mechanism after removing a housing according to another embodiment of the present disclosure.

Referring to FIG. 6, FIG. 6 is structural diagram of the driving mechanism according to another embodiment of the present disclosure. In at least one embodiment, the driving mechanism 1 can further include a gear frame 50. The gear frame 50 is rotatably coupled to one side of the gear ring 21. The gear frame 50 can have an unmovable state or a rotating state.

The above content describes that the gear ring 21 can have the unmovable state or the rotating state. at least one embodiment will describe how to make the sun gear 23 to fix or rotate. In detail, at least one embodiment is provided with the gear frame 50, and make the gear frame 50 being rotatably coupled to one side of the gear ring 31, this linking the gear frame 50 with the gear ring 21. In addition, the gear frame 50 can have the unmovable state or the rotating state. Therefore, at least one embodiment can control the rotation of the gear ring 21 by using the gear frame 50. When the gear frame 50 is in the unmovable state, the gear ring 21 is also in the unmovable state. When the gear frame 50 is in the rotating state, the gear ring 21 is also in the rotating state.

Figure 8:
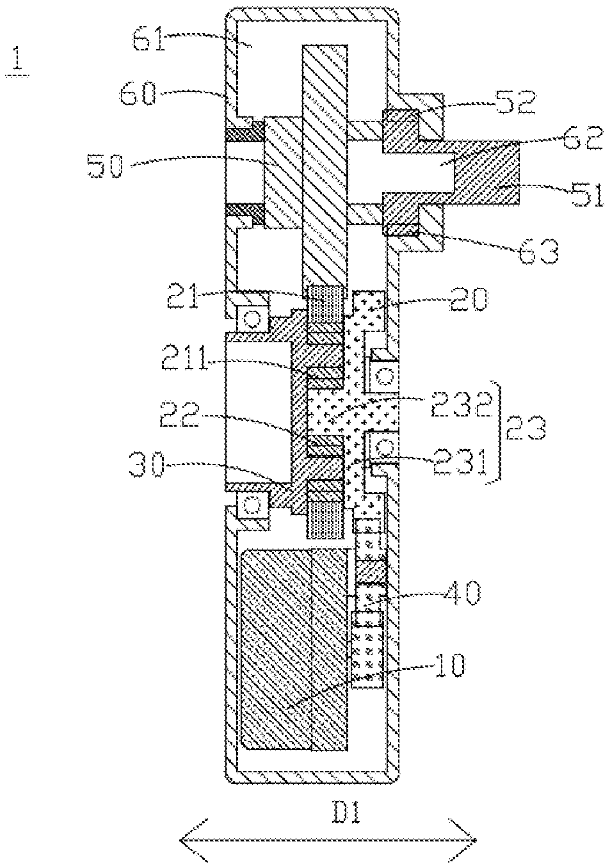
FIG. 8 is a cross-sectional diagram of the driving mechanism in the A-A direction according to another embodiment of the present disclosure.
Figure 9:
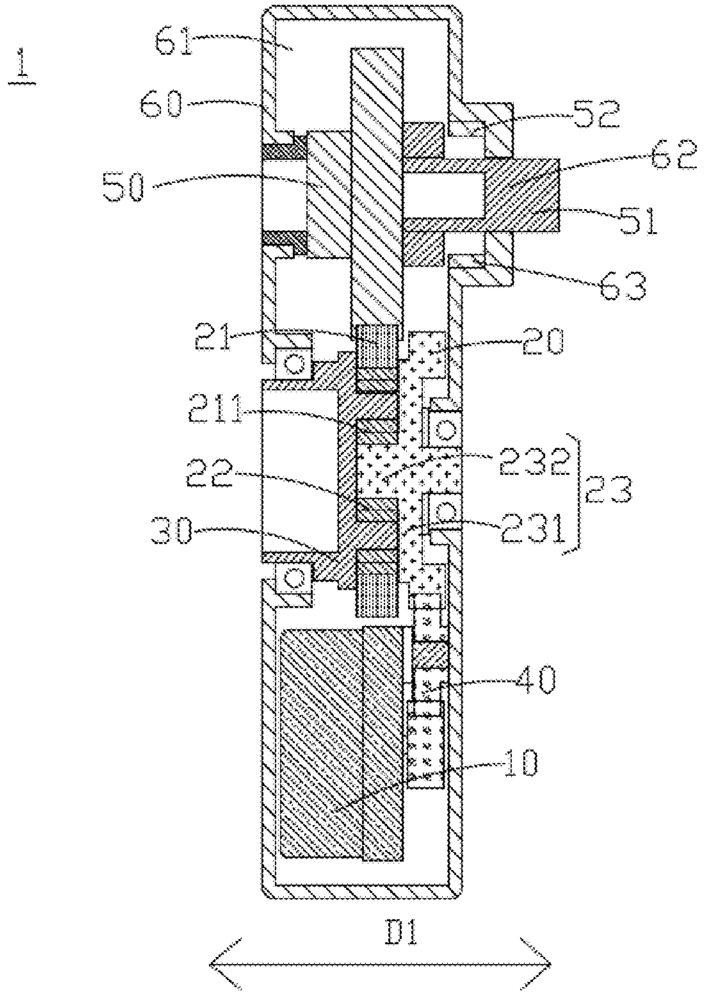
FIG. 9 is a schematic diagram of a gear frame in a rotating state according to one embodiment of the present disclosure.
Figure 10:
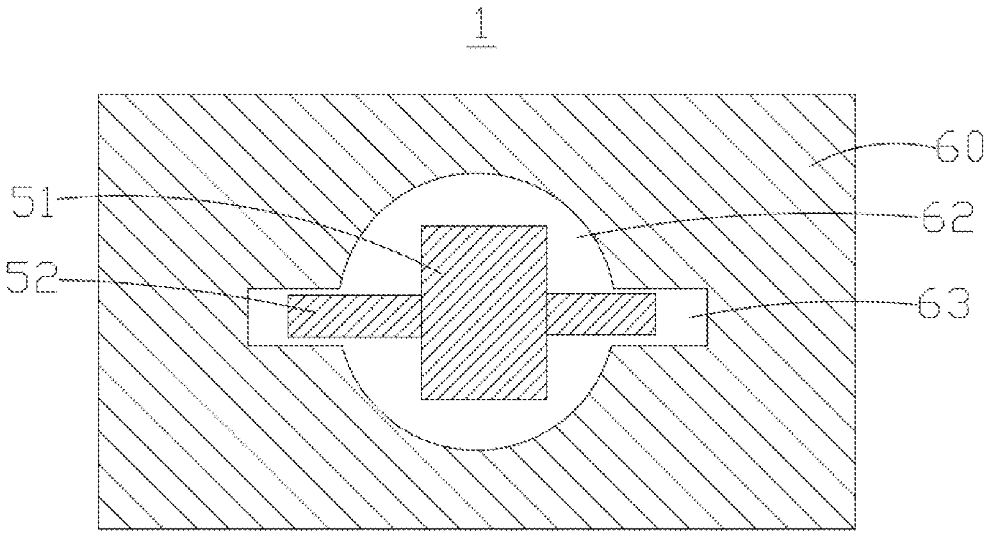
FIG. 10 is a top view of the driving mechanism according to one embodiment of the present disclosure.

Referring to FIGS. 7-10, FIG. 7 is a structural diagram of the driving mechanism after removing a housing according to another embodiment of the present disclosure. FIG. 8 is a cross-sectional diagram of the driving mechanism in the A-A direction according to another embodiment of the present disclosure. FIG. 9 is a schematic diagram of a gear frame in a rotating state according to one embodiment of the present disclosure. FIG. 10 is a top view of the driving mechanism according to one embodiment of the present disclosure. In at least one embodiment, the driving mechanism 1 can further include a handle frame 51 and a housing 60. The handle frame 51 is slidably coupled to the gear frame 50. A sliding direction of the handle frame 51 is perpendicular to a rotating direction of the gear ring 21. The housing 60 defines an accommodating space 61. The housing 60 defines a through hole 62 interconnected with the accommodating space 61. A part of the handle frame 51 passes through the through hole 62. A portion of a side wall of the through hole 62 defines a limiting slot 63. The limiting slot 62 cooperates with the handle frame 51 to limit the rotation of the handle frame 51.

at least one embodiment will describe in detail how to make the gear frame 50 have the unmovable state or the rotating state. In detail, the handle frame 51 and the housing 60 are added, and the handle frame 51 is slidably coupled to the gear frame 50, and the sliding direction of the handle frame 51 (the direction as shown in D1 in FIG. 7) is perpendicular to the rotating direction of the gear ring 21 (the direction as shown in D2 in FIG. 7). It can also be understood that the handle frame 51 is not only coupled to the gear frame 50, but can also be slid relative to the gear frame 50.

In addition, the housing 60 is an outside cover of the driving mechanism 1. Some of the structural parts can be received in the accommodating space 60 of the housing 60, thus providing a mounting case and protection base for the structural parts of the driving mechanism 1. The housing 60 defines the through hole 62. A part of the handle frame 51 passes through the through hole 62, and the other part of the handle frame 51 is located outside the accommodating space 61 of the housing 60. The handle frame 51 located outside of the accommodating space 61 is used for mounting other structural members or directly for the user to operate. In at least one embodiment, the limiting slot 63 is defined on at least part of a side wall of the through hole 62, the limiting slot 63 cooperates with the handle frame 51 to limit the rotation of the handle frame 51.

As shown in FIGS. 8 and 10, the handle frame 51 is provided with a limiting part 52. When the handle frame 51 is located in the limiting slot 63, the limiting slot 63 can limit the rotation of the limiting part 52, that is, the limiting slot 63 of the housing 60 can limit the rotation of the handle frame 51, so as to make the gear frame 50 be in the unmovable state. As shown in FIG. 9, in the process of moving the handle frame 51 toward the gear frame 50, when the limiting part 52 is disengaged from the limiting slot 63 or the limiting part 52 is disengaged from a range of a side wall of the through hole 62, the limiting slot 63 can no longer limit the limiting part 52 of the handle frame 51, so that the handle frame 51 can be rotated, thus driving the gear frame 50 to rotate so as to make the gear frame 50 be in the rotating state.

Optionally, when the gear ring 21 is to be fixed again, the handle frame 51 can be moved again in a direction away from the gear frame 50, and the limiting part 52 can be re-positioned in the limiting slot 63, thus limiting the rotation of the handle frame 51 and thus limiting the rotation of the gear frame 50 and the gear ring 21 in turn.

Figure 11:
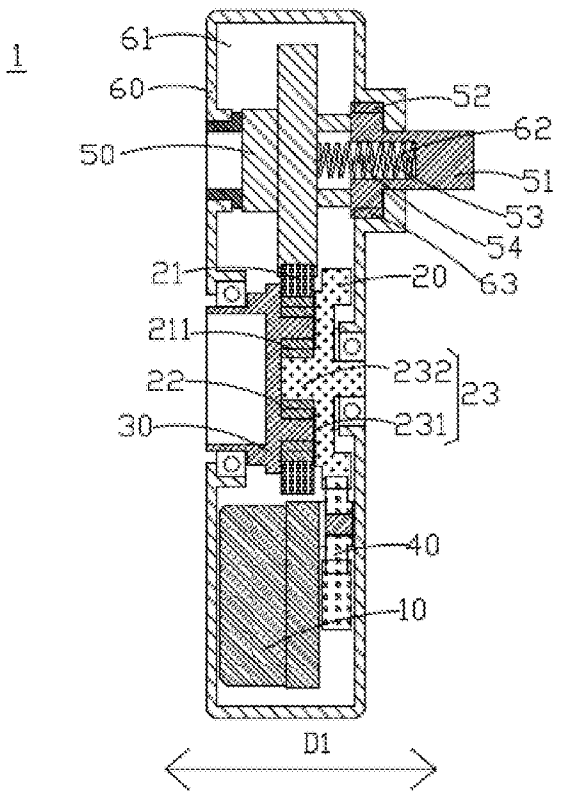
FIG. 11 is a cross-sectional diagram of the driving mechanism in the A-A direction according to another embodiment of the present disclosure.

Referring to FIG. 11, FIG. 11 is a cross-sectional diagram of the driving mechanism in the A-A direction according to another embodiment of the present disclosure. In at least one embodiment, the driving mechanism 1 can further include an elastic member 53. One end of the elastic member 53 abuts against the handle frame 51, and the other end of the elastic member 53 abuts against the gear frame 50. When the handle frame 51 moves towards a direction close to the gear frame 50, the elastic member 53 is in an compression state.

In at least one embodiment, the elastic member 53 may be provided to connect the handle frame 51 to the gear frame 50. When the handle frame 51 moves towards a direction close to the gear frame 50, the elastic member 53 is in the compressed state. At this time, the elastic member 53 will have a rebound force in it, and when the external force on the handle frame 51 is removed, the handle frame 51 can be moved automatically by the rebound force of the elastic member 53 in a direction away from the gear frame 50, and the limiting part 52 is reset in the limiting part 52, thus limiting the rotation of the handle frame 51, and in turn limiting the rotation of the gear frame 50 and the gear ring 21.

Optionally, one side of the handle frame 51 close to the gear frame 50 defines a first receiving slot 54. A part of the elastic member 53 is received in the first receiving slot 54.

In at least one embodiment, the first receiving slot 54 can be defined on one side of the handle frame 51 close to the gear frame 50, and a part of the elastic member 53 can be received in the first receiving slot 54, so that not only can improve the limiting ability of the elastic member 53, but also can reduce the size of the driving mechanism 1 and simplify the mechanism.

Referring to FIG. 7 again, in at least one embodiment, the motor 10 is located on a first side 24 of the planet gear assembly 22, the gear frame 50 is located on a second side 25 of the planer gear 22 assembly. The first side 24 is opposite to the second side 25.

As can be seen from the above content, the driving mechanism 1 provided in at least one embodiment may include the motor 10, the planet gear assembly 22, and the frame assembly. For the arrangement of these three, the motor 10 is located on the first side 24 of the planet gear assembly 22, the frame assembly is located on the second side 25 of the planet gear assembly 22, and the first side 24 is opposite to the second side 25. It can be also understood that the motor 10 and the frame assembly are provided on opposite sides of the planet gear assembly 22, so that a size of the driving mechanism 1 in a length direction is increased and a size in a thickness direction is reduced, thus making the driving mechanism 1 approximate a long and narrow shape.

Figure 12:
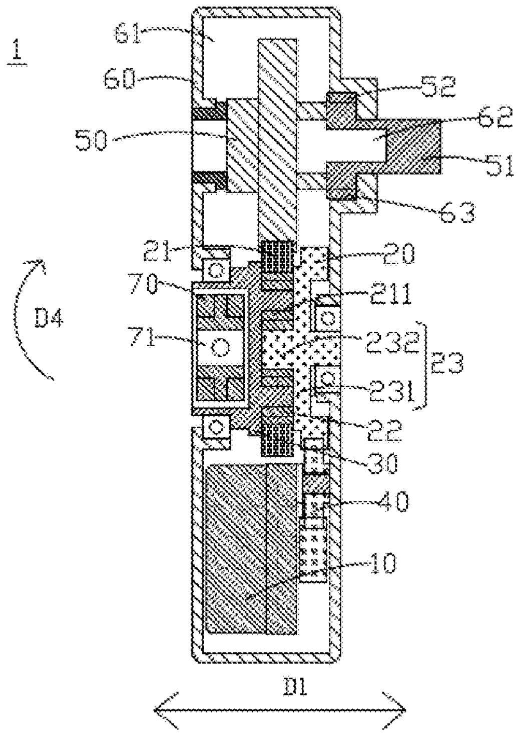
FIG. 12 is a cross-sectional diagram of the driving mechanism in the A-A direction according to another embodiment of the present disclosure.
Figure 13:
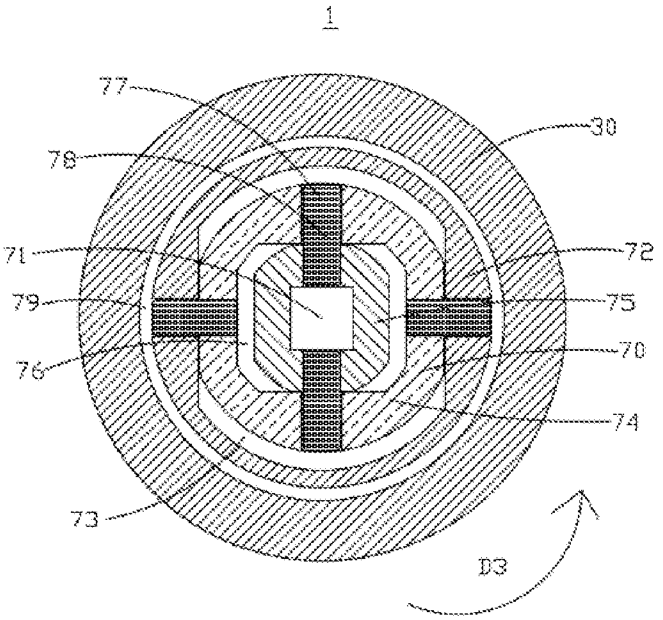
FIG. 13 is a top view of the driving mechanism according to another embodiment of the present disclosure.

Referring to FIGS. 12 and 13, FIG. 12 is a cross-sectional diagram of the driving mechanism in the A-A direction according to another embodiment of the present disclosure; FIG. 13 is a top view of the driving mechanism according to another embodiment of the present disclosure. In at least one embodiment, the driving mechanism 1 can further include an universal joint 70. The universal joint 70 is rotatably coupled to another side of the holding frame 30. The holding frame 30 has a first rotating direction. The universal joint 70 has a second rotating direction. The first direction is intersected with the second rotating direction. The universal joint 70 defines a second receiving slot 71. The second receiving slot 71 is configured to couple a lock cylinder.

As can be seen from the above content, another structural member of the door lock is connected to the other side of the holding frame 30, and the lock cylinder and the planet gear assembly 22 are located on opposite sides of the holding frame 30. The lock cylinder is preferably connected vertically to the holding frame 30, so that the driving mechanism 1 and the lock cylinder are concentric in the docking and linkage process, and thus the force on the holding frame 30 is better transferred to the lock cylinder, thus reducing the difficulty of opening the lock. Therefore, in at least one embodiment, the universal joint 70 can be added to the driving mechanism 1, so that the universal joint 70 is rotatably coupled to the other side of the holding frame 30, and the second receiving slot 71 is defined in the universal joint 70, and the second receiving slot 71 is used to connect the lock cylinder.

Alternatively, the holding frame 30 has the first rotating direction (as shown in the direction D3 in FIG. 13). The universal joint 70 has the second rotating direction (as shown in the direction D4 in FIG. 12). The first rotating direction is intersected with the second rotating direction. It is also understood that the first rotating direction is not parallel to the second rotating direction. In this way, when the lock cylinder is mounted in the second receiving slot 71, the rotation of the universal joint 70 can be used to offset the angle of deflection of the lock cylinder and the holding frame 30, so that the force on the holding frame 30 can be better transmitted to the lock cylinder, and the problem of different centers between the driving mechanism 1 and the lock cylinder in the process of docking and linkage can be corrected and solved.

Figure 14:
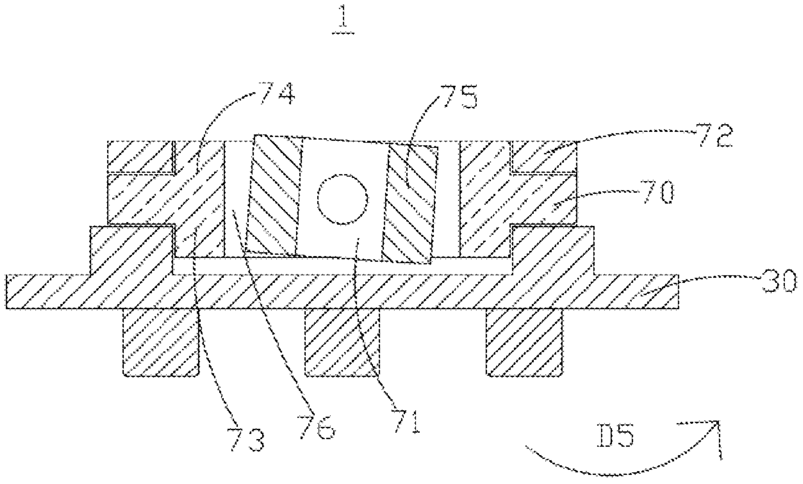
FIG. 14 is a schematic diagram of the universal joint when rotated in a first rotating direction according to one embodiment of the present disclosure.
Figure 15:
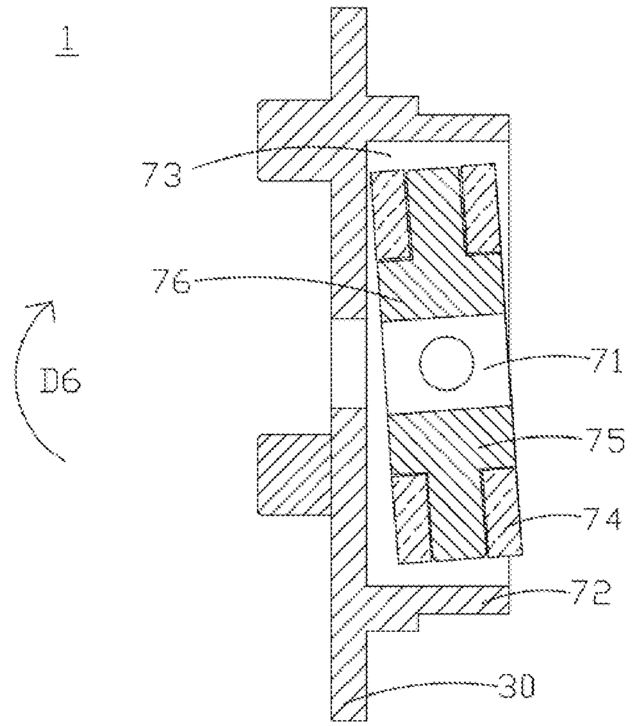
FIG. 15 is a schematic diagram of the universal joint when rotated in a second rotating direction according to one embodiment of the present disclosure.

Referring to FIGS. 14 and 15 together, FIG. 14 is a schematic diagram of the universal joint when rotated in a first rotating direction according to one embodiment of the present disclosure; FIG. 15 is a schematic diagram of the universal joint when rotated in a second rotating direction according to one embodiment of the present disclosure. In at least one embodiment, the holding frame 30 is provided with a protruding portion 72 on the other side surface. The protruding portion 72 encloses a first rotating space 73. The universal joint 70 includes a first rotating part 74, and a second rotating part 75. The first rotating part 74 is received in the first rotating space 73. The first rotating part 74 is rotatably coupled to the protruding portion 72. The first rotating part 74 defines a second rotating space 76. The second rotating part 75 is received in the second rotating space 76. The second rotating part 75 is rotatably coupled to the first rotating part 74. The second rotating part 75 defines the second receiving slot 71. The first rotating part 74 has a first sub-rotating direction. The second rotating part 75 has a second sub-rotating direction. The first sub-rotating direction is intersected with the second sub-rotating direction. Both the first sub-rotating direction and the second sub-rotating direction are intersected with the second rotating direction.

In at least one embodiment, the holding frame 30 is provided with the protruding portion 72. The first rotating part 74 and the second rotating part 75 of the universal joint 70 are received in the first rotating space 73 in the protruding portion 72. The first rotating part 74 is rotatably coupled to the protruding portion 72, so that the first rotating part 74 is coupled to the protruding portion 72 by a parallel overfitting of a rotating shaft 78. This allows the first rotating part 74 to have the first sub-rotating direction (as shown in the direction D5 in FIG. 14). Next, the second rotating part 75 may be received in the second rotating space 76 in the first rotating part 74. The second rotating part 75 may be rotatably coupled to the first rotating part 74 so that the second rotating part 75 is vertically transversely coupled to the first rotating part 74 by the rotating shaft 78. In this way, the second rotating part 75 has the second sub-rotating direction (as shown in the direction D6 in FIG. 15). The second receiving slot 71 for coupling the lock cylinder is defined in the second rotating part 75.

The second rotating direction mentioned in the above mentioned embodiment can be a combination of the first sub-rotating direction and the second sub-rotating direction. And at least one embodiment can also make the first sub-rotating direction intersects with the second sub-rotating direction, and both the first sub-rotating direction and the second sub-rotating direction intersect with the second rotating direction. This allows the universal joint 70 to have more rotating directions, thus further correcting and solving the problem of non-centricity of the driving mechanism 1 and the lock cylinder during the docking and coupling process.

Optionally, referring again to FIG. 13, in at least one embodiment, the protruding portion 72 defines a hole 77. The universal joint 70 further includes a rotation shaft 78 and a protecting part 79. The rotation shaft 78 penetrates the hole 77 and connects the first rotation part 74. The protecting part 79 snaps the protruding portion 72 so that the rotation shaft 78 abuts against the protecting part 79.

The above mentioned first rotating part 74 is rotatably coupled to the protruding portion 72. The protruding portion 72 defines the hole 77. The rotating shaft 78 penetrates the hole 77 and connects the first rotating part 74, so that the first rotating part 74 is rotatably coupled to the protruding portion 72. The present embodiment also provides the protecting part 79 outside of the protruding portion 72, with the protecting part 79 over the protruding portion 72 so that the rotating shaft 78 abuts against the protecting part 79, thereby preventing the rotating shaft 78 from falling out of the hole 77.

The embodiment of the present disclosure also provides a door lock. The door lock includes a lock cylinder, and a driving mechanism 1 as provided in the above embodiment of the present disclosure. The lock cylinder is attached to the other side of the holding frame 30. The lock cylinder moves under the rotation of the holding frame 30 so as to opening or closing the door.

The door lock provided by the embodiment of the present disclosure, by using the driving mechanism 1 provided by the above the embodiment of the present disclosure, it is possible to realize the opening or closing of the door in two ways. One of the two ways is using the motor 10 to control the sun gear 23 to rotate. The other of the two ways is directly controlling the gear ring 21 to rotate. Thus, the ways of opening and closing of the door are increased, avoiding the problem of not being able to open or close the door due to the damage of the motor 10 in a single motor 10 lock, reducing the difficulty and risk of opening the door.

The above description is only used to help understand the method of the present disclosure and its core ideas; at the same time, for the general technical personnel in the field, according to the ideas of this application, there will be changes in the specific implementation and the scope of application, in summary, the contents of this specification should not be understood as a limitation of this application.

What is claimed is:

1. A driving mechanism for a door lock, wherein the driving mechanism comprises:

a motor;

a planet gear assembly comprising a gear ring, a planet gear, and a sun gear; wherein the motor is rotatably coupled to the sun gear, the planet gear is rotatably coupled to the sun gear, and the planet gear is further rotatably coupled to the gear ring; and a holding frame being coupled to the planet gear; when the gear ring is in an unmovable state, the sun gear is rotated by the motor so as to rotate the planet gear relative to the gear ring, thereby driving the holding frame; or, when the sun gear is in an unmovable state, the gear ring is controlled to rotate so as to rotate the planet gear relative to the sun gear, thereby driving the holding frame to rotate;

wherein the driving mechanism further comprises a gear frame; the gear frame is rotatably coupled to one side of the gear ring, the gear frame has an unmovable state or a rotating state;

wherein the motor is located on a first side of the planet gear assembly; the gear frame is located on a second side of the planet gear assembly; the first side is opposite to the second side.

2. The driving mechanism according to claim 1, wherein the gear ring defines a receiving space; the planet gear and a part of the sun gear are received in the receiving space; the planet gear is rotatably coupled between the sun gear and the gear ring; and holding frame, the holding frame is located on one side of the planet gear assembly; the gear ring and the sun gear both abut against the holding frame.

3. The driving mechanism according to claim 2, wherein the sun gear comprises a first sub sun gear and a second sub sun gear provided coaxially; the motor is rotatably coupled to the first sub sun gear; the second sub sun gear is received in the receiving space; the second sub sun gear is rotatably coupled to the planet gear.

4. The driving mechanism according to claim 1, wherein the driving mechanism further comprises a universal joint; the universal joint is rotatably coupled to other side of the holding frame; the holding frame has a first rotating direction; the universal joint has a second rotating direction; the first rotating direction is intersected with the second rotating direction; the universal joint defines a second receiving slot, the second receiving slot is configured to couple a lock cylinder.

5. The driving mechanism according to claim 1, wherein the driving mechanism further comprises a handle frame and a housing; the handle frame is slidably coupled to the gear frame; a sliding direction of the handle frame is perpendicular to a rotating direction of the gear ring;

the housing defines an accommodating space; the motor, and the planet gear assembly are received in the accommodating space; the housing defines a through hole interconnected with the accommodating space; a part of side wall of the through hole defines a limiting slot; the limiting slot cooperates with the handle frame to limit a rotation of the handle frame.

6. The driving mechanism according to claim 5, wherein the driving mechanism further comprises an elastic member; one end of the elastic member abuts against the handle frame and the other end of the elastic member abuts against the gear frame; when the handle frame is moved in a direction close to the gear frame, the elastic member is in a compressed state.

7. A driving mechanism for a door lock, wherein the driving mechanism comprises:

a motor;

a planet gear assembly, comprising a gear ring, a planet gear, and a sun gear; wherein the motor is rotatably coupled to the sun gear, the planet gear is rotatably coupled to the sun gear, and the planet gear is also rotatably coupled to the gear ring; and a gear frame, the gear frame being rotatably coupled to the gear ring, wherein the gear frame has an unmovable state or a rotating state; when the gear frame is in the unmovable state, the gear ring is also in the unmovable state, the sun gear is driven by the motor to rotate so as to rotate the planet gear to rotate relative to the gear ring; or, when the sun gear is in the unmovable state, and the gear frame is in the rotating state, the gear frame is controlled to rotate, so as to rotate the gear ring, thereby driving the planet gear to rotate relative to the sun gear;

wherein the motor is located on a first side of the planet gear assembly, and the gear frame is located on a second side of the planet gear assembly, the first side is opposite to the second side.

8. The driving mechanism according to claim 7, wherein the gear ring defines a receiving space, the planet gear and part of the sun gear are received in the receiving space.

9. The driving mechanism according to claim 8, wherein the sun gear comprises a first sub sun gear and a second sub sun gear provided coaxially; the motor is rotatably coupled to the first sub sun gear; the second sub sun gear is received in the receiving space; the second sub sun gear is rotatably coupled to the planet gear.

10. The driving mechanism according to claim 7, wherein the driving mechanism further comprises a handle frame and a housing; the handle frame is slidably coupled to the gear frame; a sliding direction of the handle frame is perpendicular to a rotating direction of the gear ring;

the housing defines an accommodating space; the motor, and the planet gear assembly are received in the accommodating space; the housing defines a through hole interconnected with the accommodating space; part of the handle frame passes through the hole, and at least part of a side wall of the through hole defines a limiting slot; the limiting slot cooperates with the handle frame to limit a rotation of the handle frame.

11. The driving mechanism according to claim 7, wherein the driving mechanism further comprises a holding frame; the holding frame is coupled to the planet gear; when the gear ring is in the unmovable state, the sun gear is driven by the motor to rotate the planet gear relative to the gear ring, thereby rotating the holding frame; or, when the sun gear is in the unmovable state, the gear ring is driven to rotate, so as to rotate the planet gear relative to the sun gear, thereby rotating the holding frame.

12. The driving mechanism according to claim 11, wherein the driving mechanism further comprises a universal joint; the universal joint is rotatably coupled to other side of the holding frame; the holding frame has a first rotating direction; the universal joint has a second rotating direction; the first rotating direction is intersected with the second rotating direction; the universal joint defines a second receiving slot; the second receiving slot is configured to couple a lock cylinder mechanism.

13. A driving mechanism for a door lock, wherein the driving mechanism comprises:

a motor;

a holding frame, the motor being rotatably coupled to the holding frame; and an universal joint, the universal joint being rotatably coupled to the holding frame; wherein the holding frame has a first rotating direction and the universal joint has a second rotating direction, the first rotating direction is intersected with the second rotating direction; the universal joint is configured to couple a lock cylinder mechanism; the motor controls the holding frame to rotate so as to drive the universal joint to rotate, which in turn drives the lock cylinder mechanism to rotate.

14. The driving mechanism according to claim 13, wherein one side surface of the holding frame is provided with a protruding portion, the protruding portion encloses to form a first rotating space; the universal joint comprises a first rotating part, and a second rotating part; the first rotating part defines a first rotating space; the first rotating part is received in the first rotating space, and the first rotating part is rotatably coupled to the projecting portion;

the first rotating part defines a second rotating space, the second rotating part is received in the second rotating space; the second rotating part is rotatably coupled to the first rotating part, the second rotating part defines the first receiving slot;

the first rotating part has a first sub-rotating direction, the second rotating part has a second sub-rotating direction, the first sub-rotating direction is intersected with the second sub-rotating direction, and the first sub-rotating direction and the second sub-rotating direction are both intersected with the second rotating direction.

15. The driving mechanism according to claim 13, wherein the universal joint defines a first receiving slot, the first receiving slot is configured to couple the lock cylinder mechanism.

16. The driving mechanism according to claim 13, wherein the driving mechanism further comprises a planet gear assembly, the planet gear assembly comprising a gear ring, a planet gear, and a sun gear; the motor is rotatably coupled to the sun gear; the planet gear is rotatably coupled to the sun gear; the planet gear is further rotatably coupled to the gear ring;

the holding frame is coupled to the planet gear; when the gear ring is in an unmovable state, the sun gear is rotated by the motor so as to rotate the planet gear relative to the gear ring, thereby rotating the holding frame; or, when the sun gear is in an unmovable state, the gear ring is controlled to rotate so as to rotate the planet gear relative to the sun gear, thereby driving the holding frame to rotate.

17. The driving mechanism according to claim 16, wherein the driving mechanism further comprises a gear frame, the gear frame is rotatably coupled to one side of the gear ring, the gear frame has an unmovable state or a rotating state; the driving mechanism further comprises a handle frame and a housing, the handle frame is slidably coupled to the gear frame, a sliding direction of the handle frame is perpendicular to a rotating direction of the gear ring;

the housing defines an accommodating space; the motor, and the planet gear assembly are received in the accommodating space; the housing defines a through hole interconnected with the accommodating space; part of the handle frame passed through the through hole; at least part of a side wall of the through hole defines a limiting slot; the limiting slot cooperates with the handle frame to limit a rotation of the handle frame.

* * * * *